United States Patent
Nagaraja et al.

(10) Patent No.: US 10,848,213 B2
(45) Date of Patent: Nov. 24, 2020

(54) ASSISTING A USER EQUIPMENT (UE) IN REFERENCE SIGNAL MEASUREMENTS BASED ON MEASUREMENT SIGNALS

(71) Applicant: QUALCOMM Incorporated, San Diego, CA (US)

(72) Inventors: Sumeeth Nagaraja, Los Altos, CA (US); Ajay Gupta, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/666,036

(22) Filed: Oct. 28, 2019

(65) Prior Publication Data
US 2020/0067579 A1 Feb. 27, 2020

Related U.S. Application Data

(60) Continuation of application No. 15/987,796, filed on May 23, 2018, now Pat. No. 10,461,826, which is a
(Continued)

(51) Int. Cl.
*H04W 24/00* (2009.01)
*H04B 7/0456* (2017.01)
(Continued)

(52) U.S. Cl.
CPC ............ *H04B 7/0486* (2013.01); *H04B 7/06* (2013.01); *H04B 7/063* (2013.01); *H04B 7/0695* (2013.01);
(Continued)

(58) Field of Classification Search
CPC ...... H04B 7/0486; H04L 5/001; H04W 24/02; H04W 24/10; H04W 72/1215; H04W 88/06
See application file for complete search history.

(56) References Cited

U.S. PATENT DOCUMENTS 8,923,234 B2   12/2014  Park et al.
9,426,672 B2   8/2016   Shi et al.
(Continued)

FOREIGN PATENT DOCUMENTS

WO   2015123405 A1   8/2015
WO   2015133823 A1   9/2015

OTHER PUBLICATIONS

Intel Corporation: "Considerations on NR RRM", 3GPP Draft; R4-165030 NR RRM, 3rd Generation Partnership Project (3GPP), Mobile Competence Centre; 650, Route Des Lucioles; F-06921 Sophia Antipolis Cedex; France, vol. RAN WG4, No. Gothenburg. Sweden; Aug. 22, 2016-Aug. 26,2016, Aug. 21, 2016 (Aug. 21, 2016). XP051127815, Retrieved from the Internet: URL: http://www.3gpp.org/ftp/Meetings_3GPP_SYNC/RAN4/Docs/ [retrieved on Aug. 21, 2016].
(Continued)

*Primary Examiner* — Pakee Fang
(74) *Attorney, Agent, or Firm* — Patterson & Sheridan, L.L.P.

(57) ABSTRACT

Certain aspects of the present disclosure provide techniques for assisting a UE in measuring reference signals in a wireless communication system using beams. A BS may transmit, to a UE, information regarding one or more measurement gaps for measuring one or more reference signals. The BS may transmit, to the UE, additional information regarding at least one of direction information associated with the one or more reference signals or rank indication to be used by the UE to measure the one or more reference signals during the one or more measurement gaps. A UE may perform corresponding operations.

20 Claims, 10 Drawing Sheets

Related U.S. Application Data division of application No. 15/705,082, filed on Sep. 14, 2017, now Pat. No. 10,009,080.

(60) Provisional application No. 62/408,595, filed on Oct. 14, 2016.

(51) Int. Cl.

| | | |
|---|---|---|
| *H04L 25/02* | (2006.01) | |
| *H04B 7/06* | (2006.01) | |
| *H04L 5/00* | (2006.01) | |
| *H04W 24/02* | (2009.01) | |
| *H04W 24/10* | (2009.01) | |
| *H04B 7/08* | (2006.01) | |
| *H04W 72/12* | (2009.01) | |
| *H04W 88/06* | (2009.01) | |
| *H04L 27/26* | (2006.01) | |

(52) U.S. Cl.
CPC ............... *H04B 7/08* (2013.01); *H04L 5/001* (2013.01); *H04L 25/0224* (2013.01); *H04W 24/02* (2013.01); *H04W 24/10* (2013.01); *H04L 5/0048* (2013.01); *H04L 5/0053* (2013.01); *H04L 27/26* (2013.01); *H04W 72/1215* (2013.01); *H04W 88/06* (2013.01)

(56) References Cited

U.S. PATENT DOCUMENTS

| | | | |
|---|---|---|---|
| 10,009,080 B2 | 6/2018 | Nagaraja et al. | |
| 2010/0034158 A1 | 2/2010 | Meylan | |
| 2013/0016690 A1 | 1/2013 | Jeong et al. | |
| 2013/0329586 A1* | 12/2013 | Mucke | H04W 24/02 370/252 |
| 2014/0086209 A1* | 3/2014 | Su | H04W 74/02 370/331 |
| 2015/0092768 A1 | 4/2015 | Ng et al. | |
| 2015/0327103 A1* | 11/2015 | Tang | H04W 24/10 370/252 |
| 2015/0327104 A1 | 11/2015 | Yiu et al. | |
| 2016/0226647 A1 | 8/2016 | Wang et al. | |
| 2016/0337893 A1 | 11/2016 | Gheorghiu et al. | |
| 2016/0337916 A1 | 11/2016 | Deenoo et al. | |
| 2017/0006510 A1 | 1/2017 | Kaikkonen et al. | |
| 2017/0026865 A1 | 1/2017 | Behravan et al. | |
| 2018/0007731 A1* | 1/2018 | Park | H04W 76/15 |
| 2018/0287677 A1 | 10/2018 | Nagaraja et al. | |

OTHER PUBLICATIONS

International Search Report and Written Opinion—PCT/US2017/051784—ISA/EPO—dated Nov. 21, 2017.
Samsung: "Discussion on Beam Measurement and Tracking for 5G New Radio Interface in mmWave Frequency Bands", 3GPP Draft; R2-162226 Discussion On Beam Measurement and Tracking for 5G New Radio Interface in mmWave Frequency Bands, 3rd Generation Partnership Project (3GPP), Mobile Competence Centre; 650, Route, vol. RAN WG2, No. Dubrovnik, Croatia; Apr. 11, 2016-Apr. 15, 2016, Apr. 1, 2016 (2016-84-01), XP051082013, pp. 1-5, Retrieved from the Internet: URL: http://www.3gpp.org/ftp/tsg_ran/WG2_RL2/TSGR2_93bis/Docs/ [retrieved on Apr. 1, 2016].
Samsung: "DL Beam Management in the Multi-Beam based NR System", 3GPP Draft; R2-166391 DL Beam Management in the Multi-Beam Based NR System, 3rd Generation Partnership Project (3GPP), Mobile Competence Centre; 650, Route Des Lucioles ; F-06921 Sophia-Antipolis Ceo, vol. RAN WG2, No. Kaohsiung, Taiwan; Oct. 10, 2016-Oct. 14, 2016, Oct. 9, 2016 (Oct. 9, 2016), XP051150949, 7 Pages, Retrieved from the Internet: URL: http://www.3gpp.org/ftp/Meetings_3GPP_SYNC/RAN2/Docs/ [retrieved on Oct. 9, 2016].

* cited by examiner

ASSISTING A USER EQUIPMENT (UE) IN REFERENCE SIGNAL MEASUREMENTS BASED ON MEASUREMENT SIGNALS

CROSS-REFERENCE TO RELATED APPLICATIONS

This application is a continuation of commonly-owned U.S. application Ser. No. 15/987,796 filed May 23, 2018, entitled "Assisting a User Equipment (UE) in Reference Signal Measurements Based on Measurement Report," which is a divisional application of U.S. application Ser. No. 15/705,082, filed on Sep. 14, 2017, entitled "Reference Signal Measurements," both of which claim benefit of priority from commonly-owned U.S. Provisional Application Ser. No. 62/408,595, filed Oct. 14, 2016, and entitled "Reference Signal Measurements," all of which are expressly incorporated herein by reference in their entirety.

INTRODUCTION

Aspects of the present disclosure relate generally to wireless communications, and more particularly, to a base station (BS) assisting a user equipment (UE) in measuring one or more reference signals (RSs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for assisting a UE in performing measurements of one or more reference signals. As described herein the reference signals may be transmitted via a beam (e.g., using beamformed communication). For example, the reference signal may be transmitted using a transmit beam.

Certain aspects of the present disclosure provide a method for wireless communication that may be performed, for example, by a BS. The method generally includes transmitting, to a UE, information regarding one or more measurement gaps for measuring one or more reference signals and transmitting, to the UE, additional information regarding at least one of direction information associated with the one or more reference signals or rank indication to be used by the UE to measure the one or more reference signals during the one or more measurement gaps.

Certain aspects of the present disclosure provide an apparatus for wireless communication that may be performed, for example, by a BS. The apparatus generally includes means for transmitting, to a UE, information regarding one or more measurement gaps for measuring one or more reference signals and means for transmitting, to the UE, additional information regarding at least one of direction information associated with the one or more reference signals or rank indication to be used by the UE to measure the one or more reference signals during the one or more measurement gaps.

Certain aspects of the present disclosure provide an apparatus for wireless communication by a BS comprising a processor and a memory coupled to the at least one processor. The at least one processor is generally configured to transmit to a UE, information regarding one or more measurement gaps for measuring one or more reference signals and transmit, to the UE, additional information regarding at least one of direction information associated with the one or more reference signals or rank indication to be used by the UE to measure the one or more reference signals during the one or more measurement gaps.

Certain aspects of the present disclosure provide a computer readable medium for wireless communication by a BS having computer-executable instructions stored thereon for transmitting, to a UE, information regarding one or more measurement gaps for measuring one or more reference signals and transmitting, to the UE, additional information regarding at least one of direction information associated with the one or more reference signals or rank indication to be used by the UE to measure the one or more reference signals during the one or more measurement gaps.

Certain aspects of the present disclosure provide a method for wireless communication that may be performed, for example, by a UE. The method generally includes receiving, from a BS, information regarding one or more measurement gaps for measuring one or more reference signals, receiving, from the BS, additional information regarding at least one of direction information associated with the one or more reference signals or rank indication to be used to measure the one or more reference signals during the one or more measurement gaps, and measuring the one or more reference signals in one of the measurement gaps using the additional information.

Certain aspects of the present disclosure provide an apparatus for wireless communication that may be performed, for example, by a UE. The apparatus generally includes means for receiving, from a BS, information regarding one or more measurement gaps for measuring one or more reference signals, means for receiving, from the BS, additional information regarding at least one of direction information associated with the one or more reference signals or rank indication to be used to measure the one or more reference signals during the one or more measurement gaps, and means for measuring the one or more reference signals in one of the measurement gaps using the additional information.

Certain aspects of the present disclosure provide an apparatus for wireless communication by a UE comprising a processor and a memory coupled to the at least one processor. The at least one processor is generally configured to receive, from a BS, information regarding one or more measurement gaps for measuring one or more reference signals, receive, from the BS, additional information regarding at least one of direction information associated with the one or more reference signals or rank indication to be used to measure the one or more reference signals during the one or more measurement gaps, and measure the one or more reference signals in one of the measurement gaps using the additional information.

Certain aspects of the present disclosure provide a computer readable medium for wireless communication by a UE having computer-executable instructions stored thereon for receiving, from a BS, information regarding one or more measurement gaps for measuring one or more reference signals, receiving, from the BS, additional information regarding at least one of direction information associated with the one or more reference signals or rank indication to be used to measure the one or more reference signals during the one or more measurement gaps, and measuring the one or more reference signals in one of the measurement gaps using the additional information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
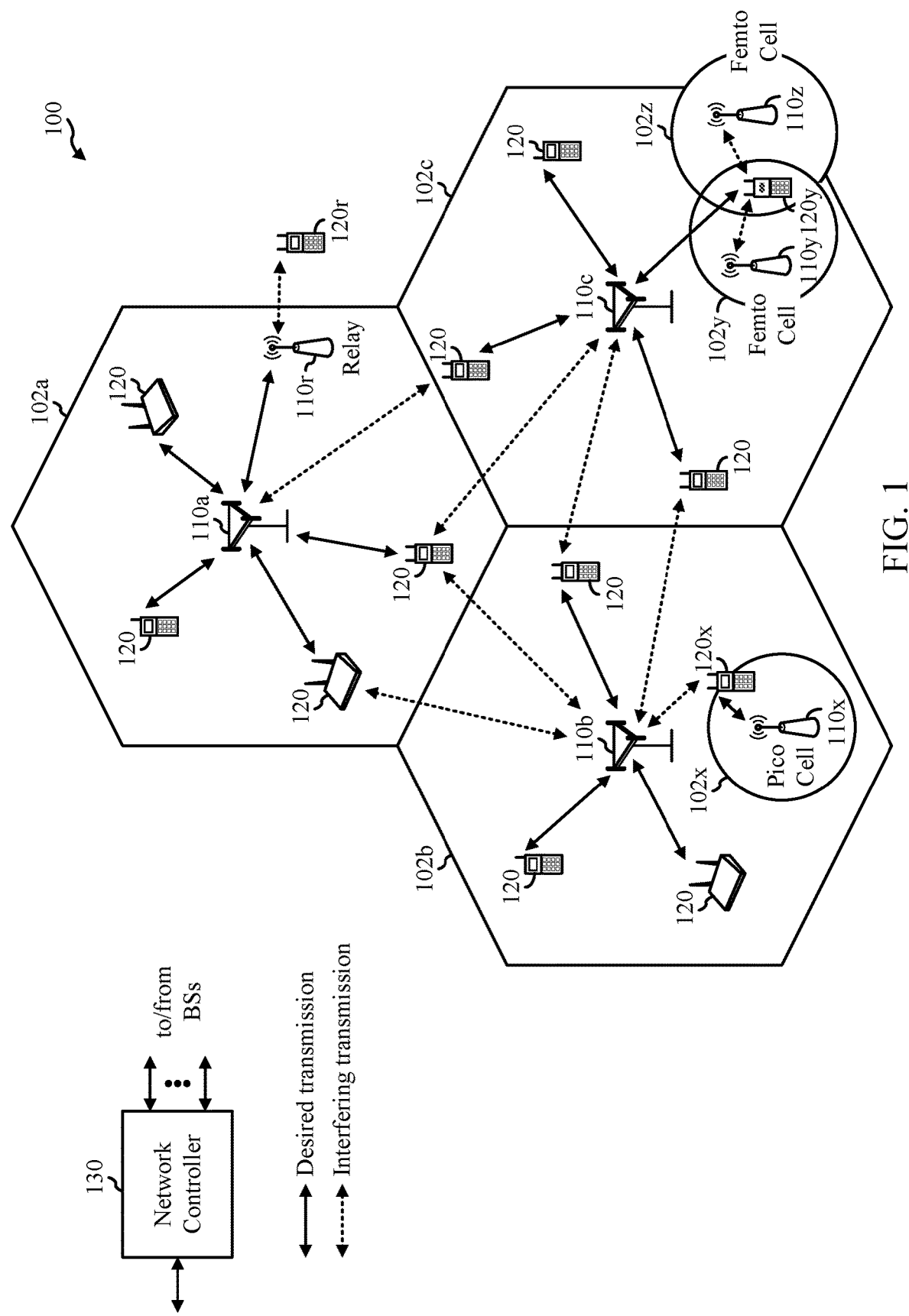
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure provide techniques and apparatus for assisting a UE in performing measurements of one or more reference signals (RSs). The RSs may be transmitted by a BS, such as a serving BS and a neighboring BS, via a beam. As an example, one or more BS may transmit beamformed RSs using a transmit beam. A UE may use a receive beam to receive the transmitted beamformed RS.

As described herein, a BS may transmit, to a UE, information regarding one or more measurement gaps for measuring one or more RSs. The BS may also transmit, to the UE additional information regarding direction information associated with the one or more reference signals and/or rank indication to be used by the UE to measure the one or more RSs during the one or more measurement gaps.

The UE may perform measurements on the RSs during the measurement gaps and may report information regarding the measured RSs to a serving BS. The serving BS may take one or more actions based, at least in part, on the received report. For example, the BS may perform a handover from the BS to a neighboring, target BS or may switch from a first active beam associated with the BS to a second active beam associated with the BS for serving the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network.

Certain wireless communication systems employ beams, where a BS and UE communicate via active beams. Active beams may refer to BS and UE beam pairs that carry data and/or control channels such as PDSCH, PDCCH, PUSCH, and PUCCH. To facilitate beam selection and/or handover decisions, a UE may measure one or more RSs. The RSs may include, for example, a measurement reference signal (MRS), beam reference signal (BRS), channel state information-reference signal (CSI-RS), primary synchronization signal (PSS), and secondary synchronization signal (SSS).

In scenarios where multiple BSs communicate with a UE using (multiple) beams having different directions, the UE may benefit from assistance in determining the neighboring BSs that are in the UE's vicinity. The UE may also benefit from receiving assistance regarding one or more of the antenna subarray configuration to use to measure the RSs, a number of radio frequency (RF) chains to use to measure the RSs, and/or the direction of the receive beam the UE may use to receive one or more RSs.

As described herein, a UE may receive information regarding one or more measurement gaps, in which one or more RSs may be transmitted. The RS may be transmitted by the serving BS and/or or more neighboring BSs using beamformed communication. The UE may also receive additional information to assist the UE in measuring one or more RSs during the measurement gap. For example, the additional information may include direction information associated with one or more RSs that may be transmitted in a measurement gap and/or indication of the rank to be used by the UE to measure the RSs during the one or more measurement gaps.

Absent this additional information, the UE may blindly sweep in multiple directions to measure RSs or may not know which RF chain(s) to use to measure the RSs during the measurement gaps.

After measuring the one or more RSs transmitted from the serving BS and one or more neighboring BSs, the UE may transmit measurement information associated with the one or more RSs. Accordingly, aspects described herein allow for more efficient RS measurement by UEs. The BS may make beam selection or handover decisions based, at least in part, on the measurement reports.

UEs 120 may be configured to perform the methods described herein and discussed in more detail below for measurement of RS transmitted via beams. The UE 120 may perform the operations 1100 and other methods described herein. BS 110 may comprise a transmission reception point (TRP), Node B (NB), 5G NB, access point (AP), new radio (NR) BS, etc.). The NR network 100 may include the central unit. The BS 110 may perform the operations 1000 and other methods described herein.

As illustrated in FIG. 1, the wireless network 100 may include a number of BSs 110 and other network entities. The network entities including the BS and UEs may communicate using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc.

Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
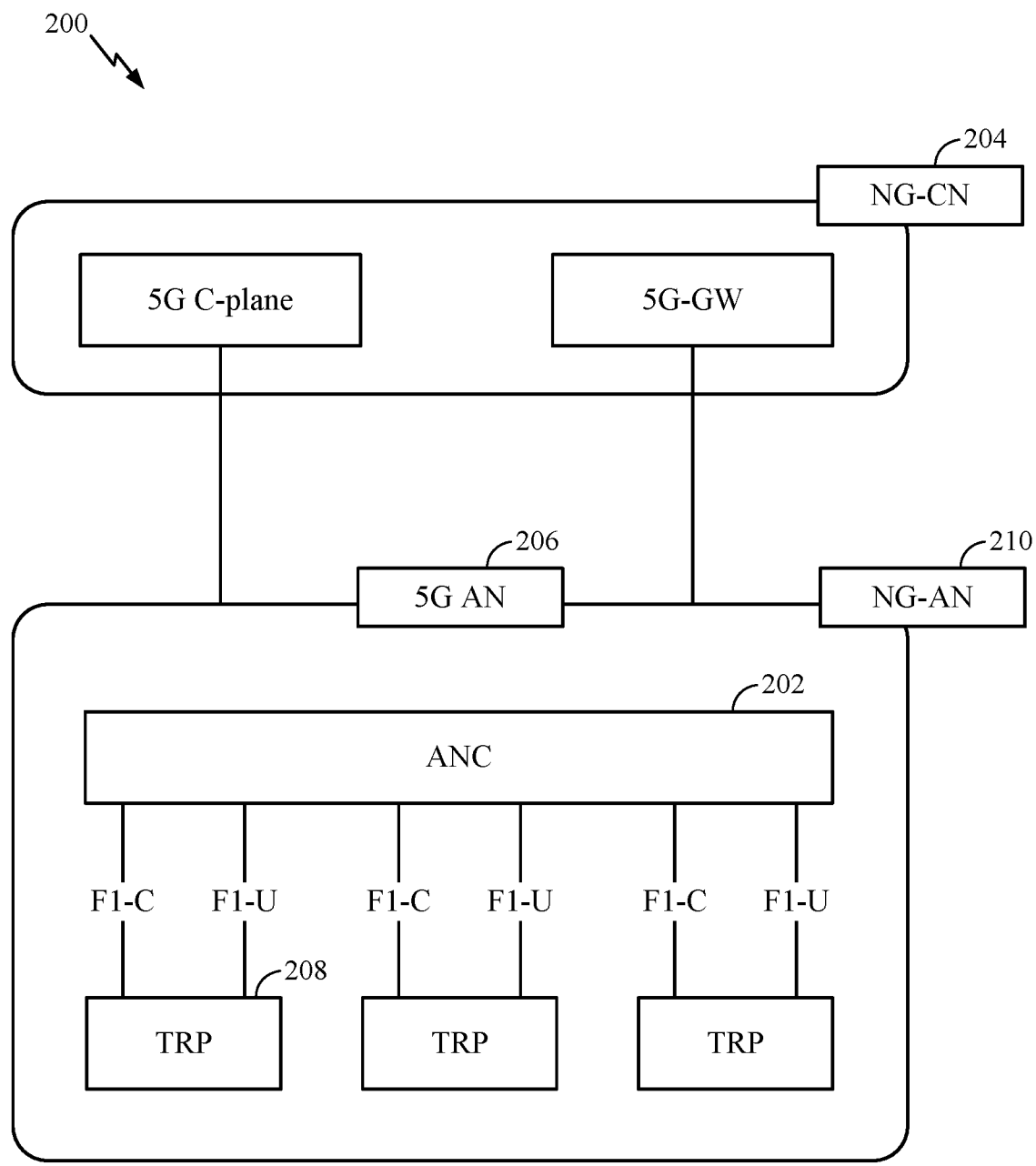
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
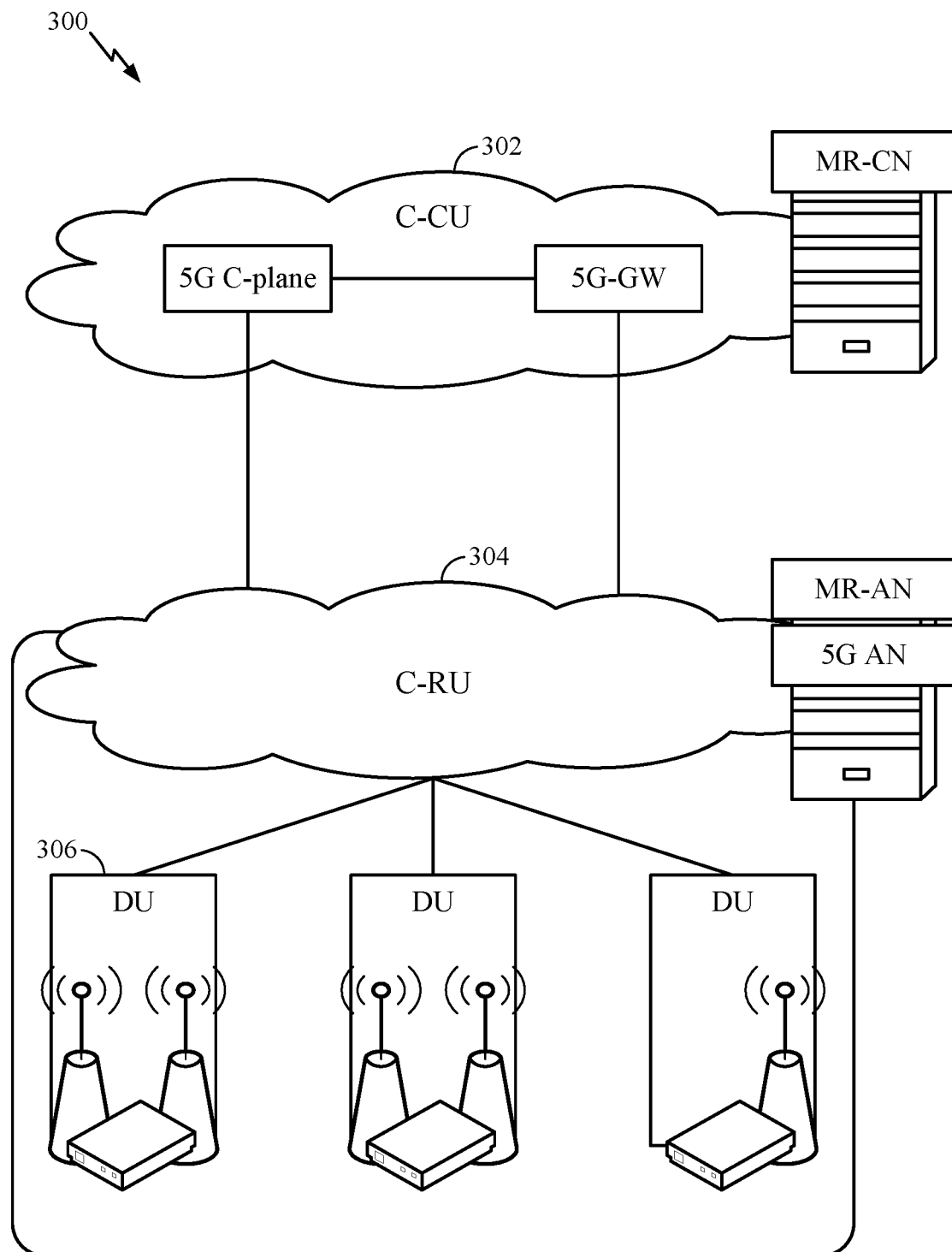
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
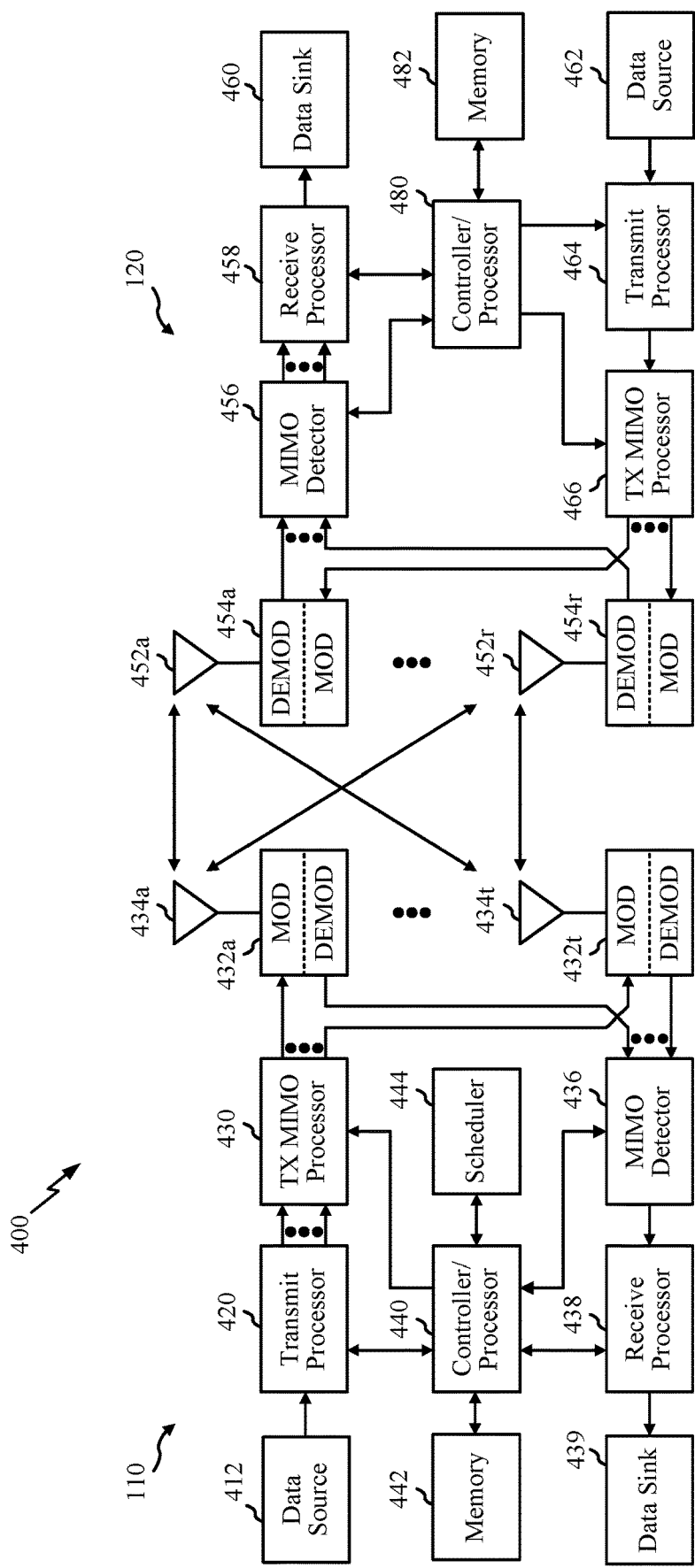
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Mod/Demod 454, processors 466, 458, 464, and/or controller/processor 480 of the UE 120 and/or antennas 434, Mod/Demod 432, processors 420, 430, 438, and/or controller/processor 440 of the BS 110 may be used to perform the operations described herein and illustrated with reference to FIGS. 10-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein. The processor 480 and/or other processors and modules at the UE 120 may also perform or direct, e.g., the execution of the corresponding/complementary processes for the techniques described herein and as illustrated in FIG. 11. The memories 442 and 482 may store data and program codes for the BS 110 and the UE 120, respectively. A scheduler 444 may schedule UEs for data transmission on the downlink and/or uplink.

Figure 5:
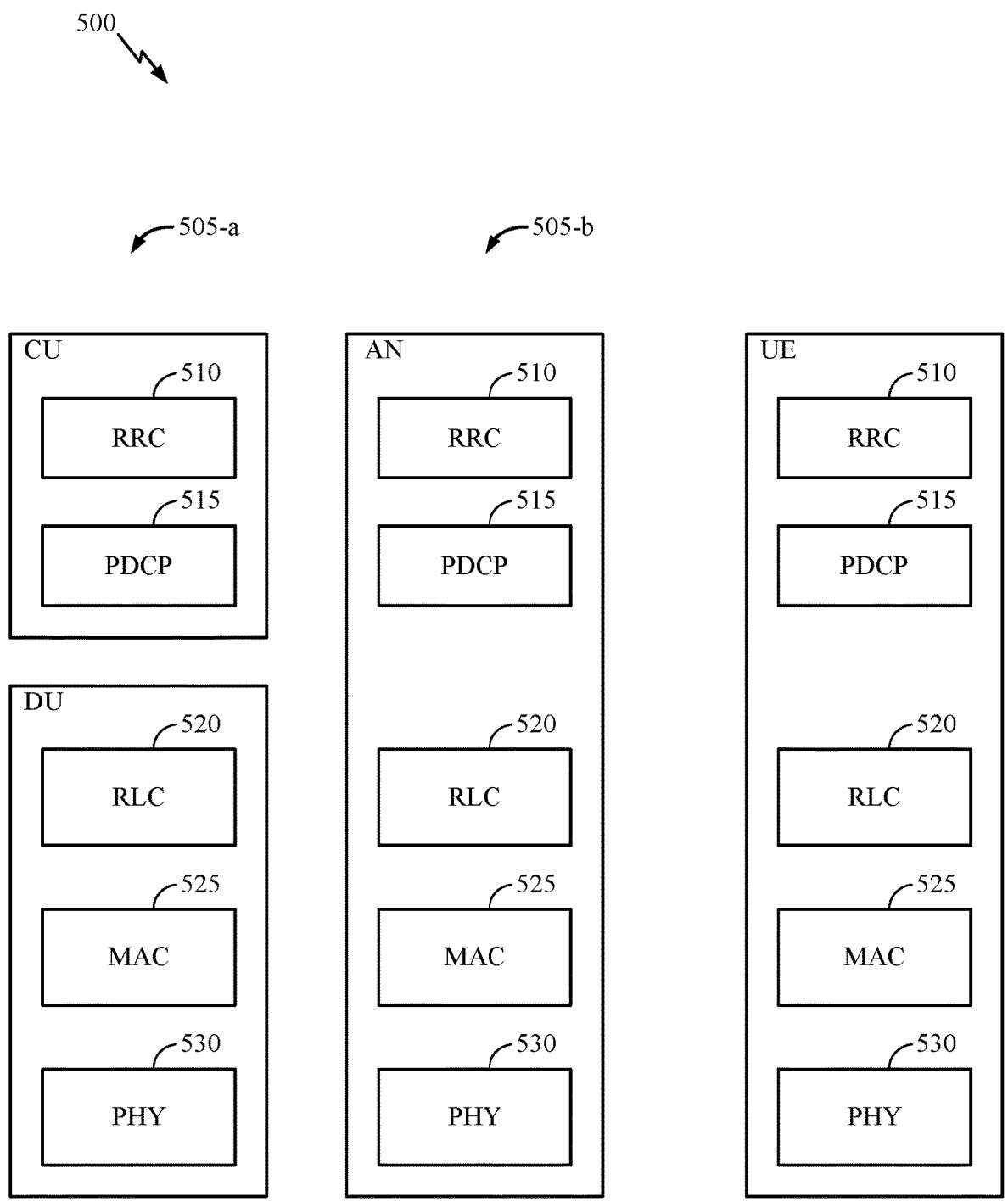
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
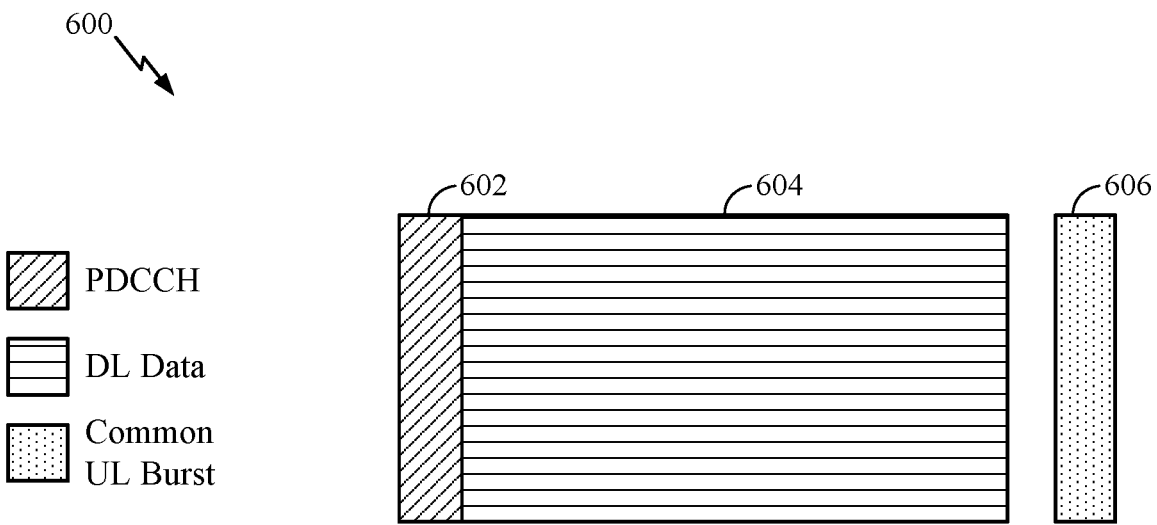
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PD SCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
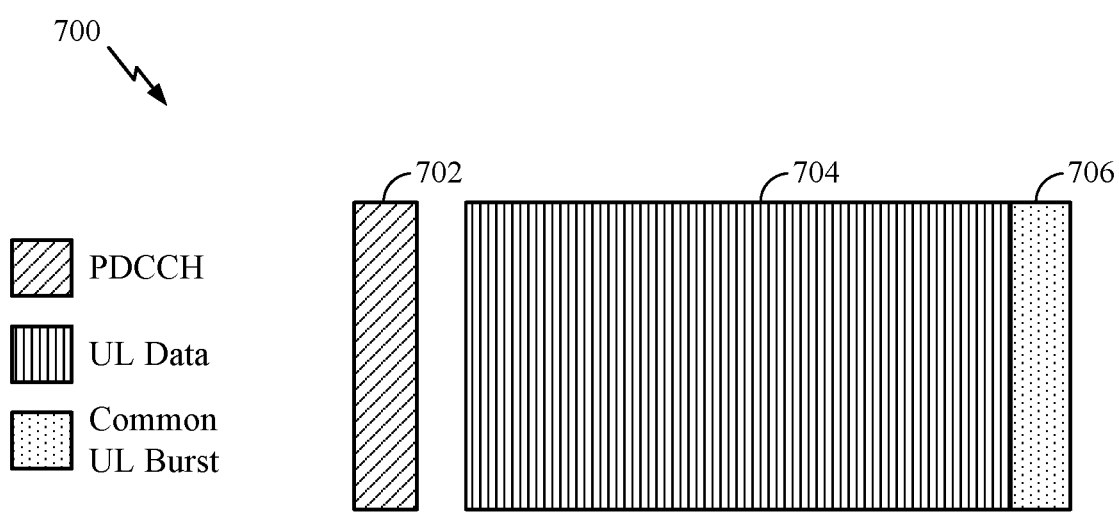
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example RS Measurement Assistance

One challenge in some wireless systems, such as those systems in which devices communicate via beams, is that of high path loss. This necessitates new techniques such as hybrid beamforming (analog and digital), which are not present in 3G and 4G systems. Hybrid beamforming creates narrow beam patterns to users that may enhance link budget and signal to noise ratio (SNR).

Figure 8:
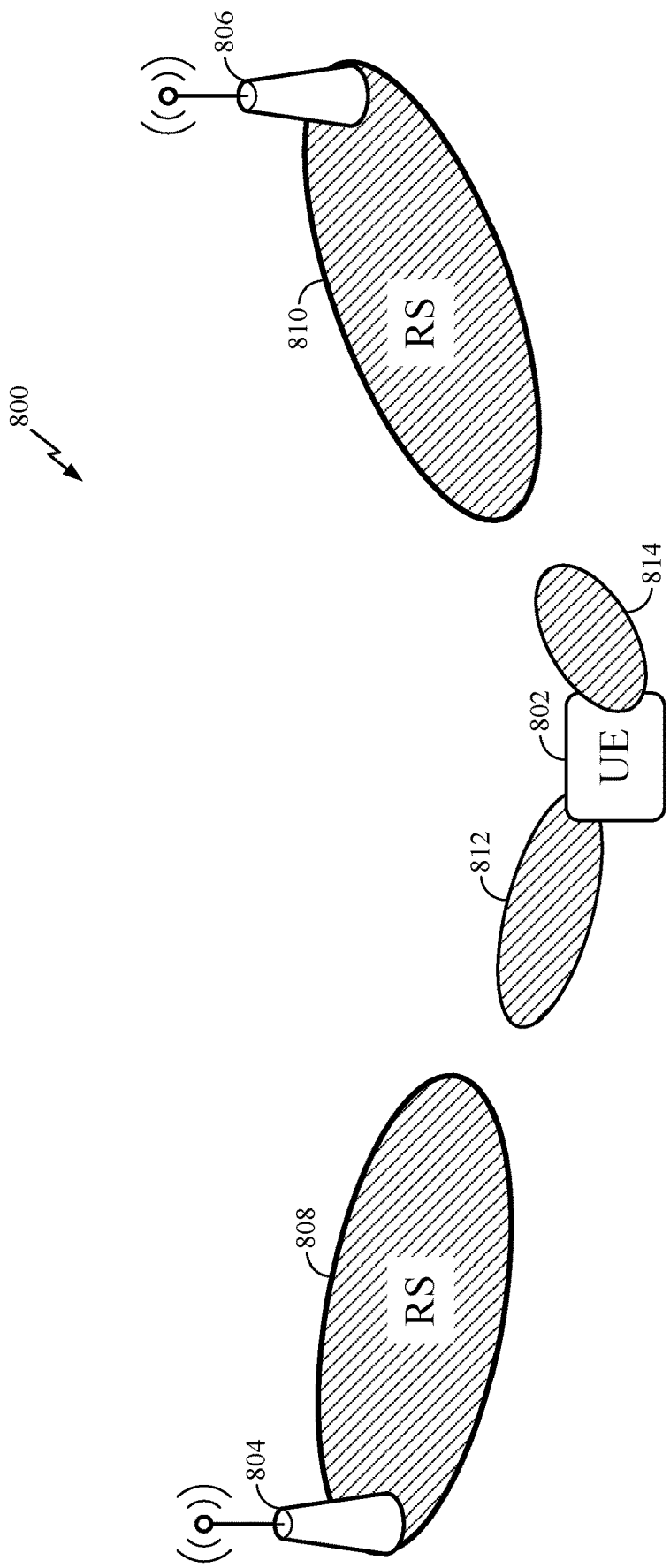
FIG. 8 illustrates an example wireless communication system, in which a UE and BSs communicate using beams.

FIG. 8 illustrates an example wireless communication system 800, in which a UE and BSs communicate using beams. The UE 802 may be in the vicinity of a first BS 804 and a second BS 806. The UE 802 and one or more of the BSs 804, 806 may communicate using active beams. Active beams may be BS and UE beam pairs that carry data and/or control channels such as PDSCH, PDCCH, PUSCH, and PUCCH. For example, the BS beam 808 and UE beam 812 may represent a beam pair. Similarly, the BS beam 810 and UE beam 814 may represented a beam pair.

A BS may monitor these beams using beam measurements and feedback from a UE, in an effort to make beam selection and handover decisions for a UE. The BS may monitor beams using feedback based on RSs, such as measurement reference signals (MRS), beam reference signals (BRS), channel state information-reference signals (CSI-RS), primary synchronization signals (PSS), secondary synchronization signals (SSS), or a new radio reference signal (NR-synch signal (SS)). NR defines several types of synchronization signals—NR-PSS, NR-SSS, and demodulated reference signal (DMRS) associated with PBCH. NR-PSS is defined at least for initial symbol boundary synchronization to the NR cell. NR-SSS is defined for detection of NR cell ID or at least part of NR cell ID. Based, at least in part on one or more NR-SSs, the UE may transmit a measurement report to a BS. The measurement report may be used for mobility management decisions associated with the UE.

For example, the BS may send a RS measurement request to the UE. The UE may take measurements on the RSs and transmit a RS measurement report. Based on the received RS measurement report, the BS may make beam selection and/or handover decisions regarding the UE.

Beam selection may refer to a serving BS switching the active beam used to serve the UE. For example, the BS may be using a first active beam to communicate with the UE and may switch to a second active target beam to serve the UE. Handover may refer to a change in a serving BS for a UE. For example, a UE may be handed over from the serving BS to a target, neighboring BS.

Figure 9:
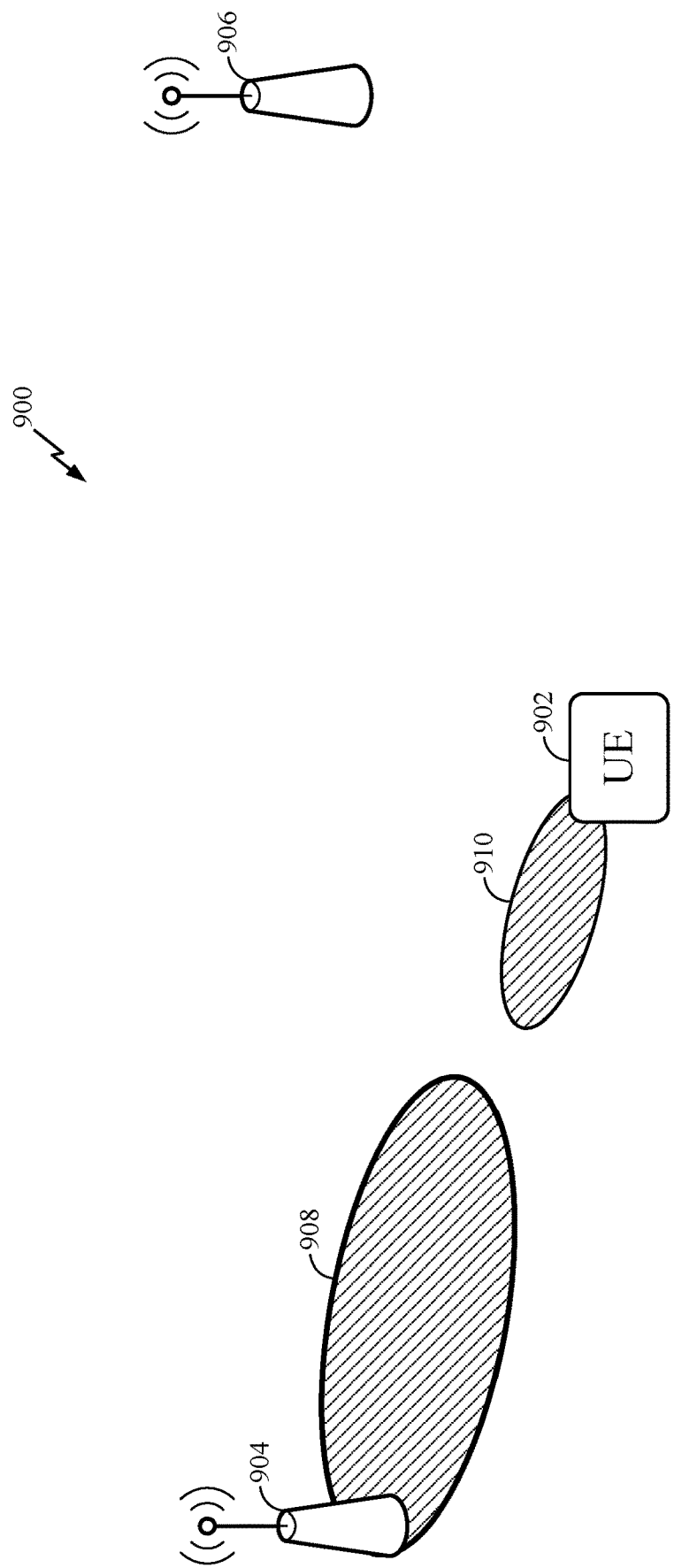
FIG. 9 illustrates an example wireless communication system, in which a UE and BSs communicate using beams.

FIG. 9 illustrates an example wireless communication system 900 in which a UE and BSs communicate using beams. A UE 902 may communicate with a BS 904 using beam pair 908 and 910. As illustrated, there may not be any beams formed toward a neighboring BS 906.

The UE 902 may communicate with the BS 904 using rank 1 transmission (e.g., via 1 beam). This means that there may only be one link between the UE 902 and the BS 904. When the BS 904 instructs the UE 902 to perform RS measurements of neighboring BSs 906, the UE may not be aware of the location and/or beam direction used by the neighboring BSs to transmit a downlink RS. Stated otherwise, the UE may not be aware of the neighboring BS 906 and/or may not be aware of the beam used by the BS 906 to transmit one or more RSs.

Accordingly, the UE 902 may perform a "sweep" in many/all directions, in an effort to measure the RSs transmitted by neighboring BSs. By performing the sweep, the UE may detect RS from a neighboring BS, such as BS 906. The UE may determine the presence of the neighboring BS based on the RS detected via the search for RSs in many/all directions. The search procedure may be time consuming, may add a delay in measuring RSs, and may be resource inefficient.

Because the UE may not be aware of a RS signal direction, and because a RS may arrive from multiple BSs, aspects of the present disclosure provide techniques for helping the UE identify one or more BSs in the UE's vicinity. Additionally, aspects also assist a UE in determining which RF chains to use for RS measurements.

Figure 10:
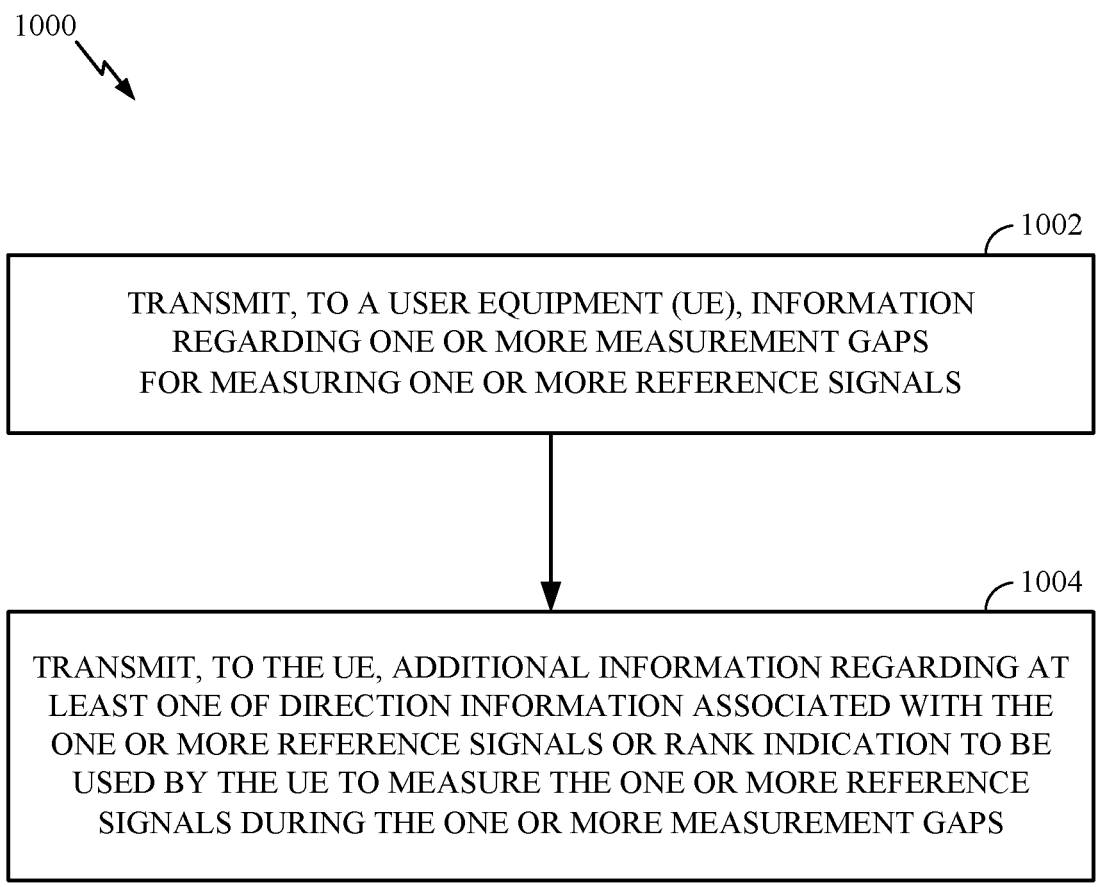
FIG. 10 illustrates example operations performed by a BS, in accordance with certain aspects of the present disclosure.
Figure 11:
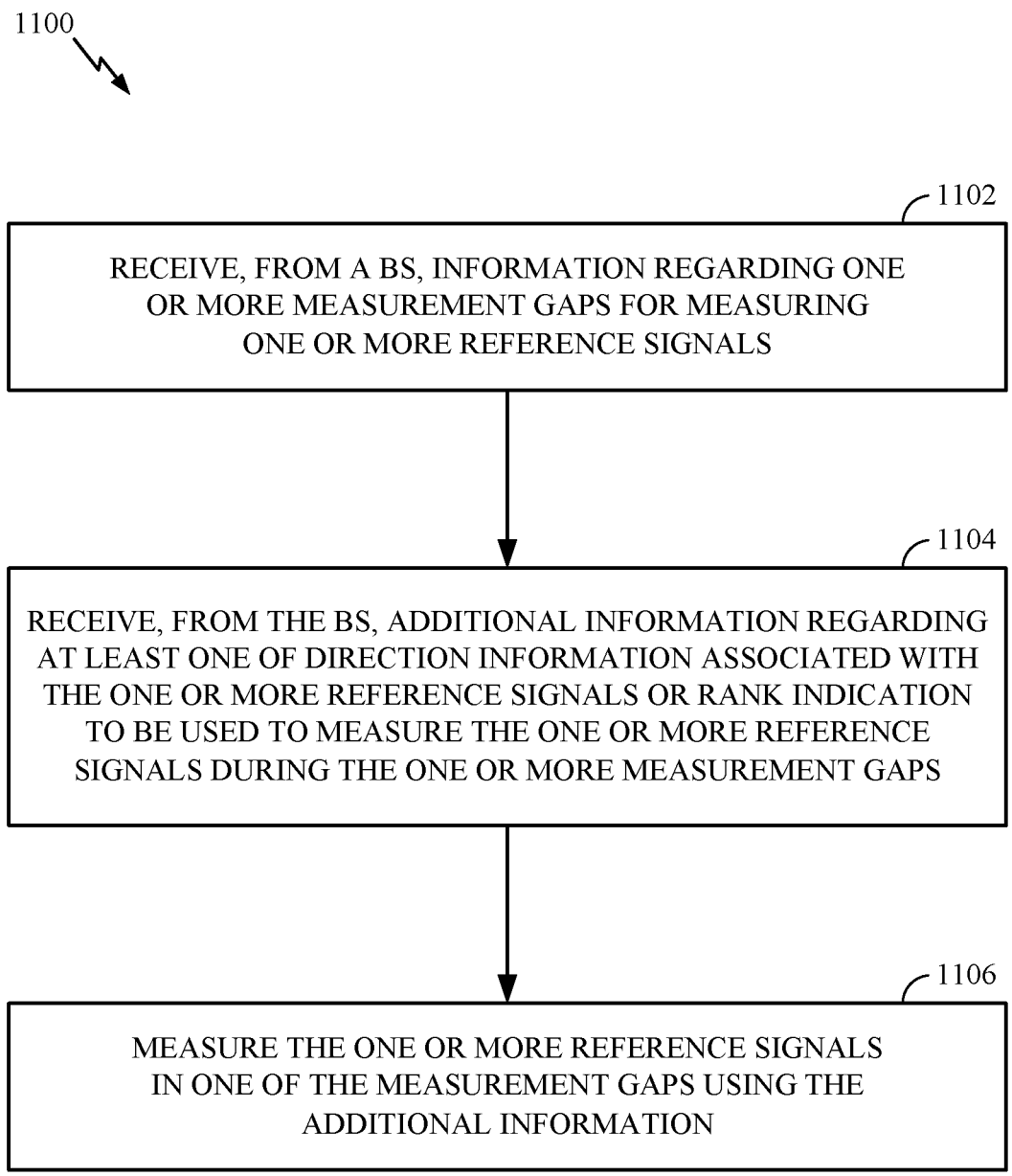
FIG. 11 illustrates example operations performed by a UE, in accordance with certain aspects of the present disclosure.

FIG. 10 illustrates example operations, which may be performed by BS, according to aspects of the present disclosure. The BS may include one or more modules of the BS 110 illustrated in FIG. 4. The BS 110 may communicate with a UE 120 using beams.

At 1002, the BS may transmit, to a user UE, information regarding one or more measurement gaps for measuring one or more reference signals. As described herein, the reference signals may be transmitting using beams. At 1004, the BS may transmit, to the UE, additional information regarding at least one of direction information associated with the one or more reference signals or rank indication to be used by the UE to measure the one or more reference signals during the one or more measurement gaps.

After configuring the measurement gaps, the UE may measure RSs transmitted by the serving BS and neighboring BS. The BS may receive, from the UE, measurement information associated with the one or more RSs transmitted during the measurement gaps. The measurement information may be used to perform one of a handover from the serving BS to a target BS or switching from a first active beam associated with the serving BS to a second active target beam associated with the serving BS for serving the UE.

FIG. 11 illustrates example operations, which may be performed by UE, according to aspects of the present disclosure. The BS may include one or more modules of the BS 120 illustrated in FIG. 4. The UE 120 may communicate with a BS 110 using beams.

At 1102, the UE may receive, from a BS, information regarding one or more measurement gaps for measuring one or more reference signals. The reference signals may be transmitted using beamformed communication. At 1104, the UE may receive, from the BS, additional information regarding at least one of direction information associated with the one or more reference signals or rank indication to be used to measure the one or more reference signals during the one or more measurement gaps. At 1106, the UE may measure the one or more reference signals in one of the measurement gaps using the additional information.

Measurement Gaps

In some wireless communication systems, such as LTE, the serving cell may schedule a UE with inter-frequency measurement gaps. During the measurement gaps, a UE may tune away to a different frequency to search for signals in the target frequency. After measuring signals in the target frequency, a UE may report an indication of the inter-frequency measurements to the serving cell.

In a wireless communication system using beams, however, a UE may need to select a direction and/or an antenna subarray to measure RSs. The beam direction and antenna subarray used for measuring RSs (transmitted from the serving or neighboring BSs) may be the same or different than the direction and antenna subarray used for communicating with the serving BS.

A BS may assist the UE in measuring RS transmitted via beams by providing one or more sets of measurement gap configurations. A measurement gap configuration may indicate a schedule for the UE to tune-away to measure RSs transmitted by the serving BS or neighboring BSs for intra-frequency measurements.

According to aspects of the present disclosure, the measurement gap configuration may be transmitted via a Layer 1 control channel, Layer 2 control channel, and/or Layer 3 signaling. The measurement gap configuration may include one or more of a system frame number (SFN), subframe index (SFI), or symbol index associated with at least one of the RS to be transmitted during the measurement gap.

The measurement gap configurations may be activated/deactivate by BS through L1/L2/L3 messages. Once the configuration is activated, the serving and neighboring BSs may transmit RSs according to the configuration. The transmission may be periodic or on-demand. Periodic transmission may refer to RSs transmitted at certain times. On-demand transmission may refer to a single transmission of a RS.

The serving BS and neighboring BS may coordinate transmission of RS for the measurement gap. The serving BS and one or more neighboring BS may transmit the RSs to the UEs during the measurement gap. Thus, the source BS may activate the measurement gaps and may instruct the UE to measure a RS transmitted from the serving BS as well as one or more neighboring BS. The source BS and the neighboring BS may transmit RSs in a non-SYNC region of a subframe, such as a data region.

The UE may use the measurement gap configuration information to tune way for intra-frequency measurements. As will be described in more detail below, the UE may receive additional information to facilitate RS measurements during the tune away periods defined by the measurement gaps.

Direction Indication

The measurement gap information may indicate when the UE is to tune away to measure RSs; however, it may not provide information regarding in what direction the RS may be transmitted by the serving or neighboring BSs. According to aspects, the BS may request the UE report beams received during a SYNC-sweep. A SYNC-sweep may refer to a UE searching for beams transmitted in a synchronization region of a subframe or in a synchronization subframe.

According to an example, a BS may transmit a number of beams in different directions around the BS. The UE may measure RSs (e.g., NR-SS, MRS, BRS, PSS, SSS) transmitted in a synchronization region/synchronization subframe and may report beam identifications associated with the received RSs to the serving BS.

As an example, with reference to FIG. 9, as a result of a SYNC-sweep, the UE 902 may report to the BS 904, that the UE received an RS on, for example, beam ID 0 associated with the BS 904 and beam ID 8 associated with the BS 906. Serving BS 904 may determine that the UE is located between beam ID 0 of BS 904 and beam ID 8 of BS 906. The BS 904 may instruct the UE to tune in the direction of beam ID 8 from BS 906 because the RS signal from BS 906 may arrive roughly in the direction of the beam 8 from BS 906. Thus, according to one example, the BS may indicate to the UE that the RS is configured in the direction of a beam from the SYNC-sweep.

According to aspects, when there is no RS to identify the beam index information for a signal transmitted in a synchronization region/synchronization subframe, the BS may request the UE report one or more of a radio frame, a subframe index, symbol index information, cell identification, or signal strength associated with the one or more beams transmitted in the synchronization region. When there is a reference signal to identify a beam, but the UE is not aware of the reference signal to beam ID mapping, the BS may request the UE report one or more of a radio frame, a subframe index, symbol index information, cell identification, or signal strength associated with the one or more beams transmitted in the synchronization region. According to aspects, the UE may decode broadcast channels to determine the periodicity for the synchronization region/synchronization subframe. Based on the periodicity, the UE may derive beam identification information for a detected RS.

According to aspects, the measurement report regarding RS in the SYNC region may include at least one of a subarray configuration or receive beam used by the UE to measure the one or more beams in the synchronization region. The subarray configuration may indicate the UE beam ID used to receive the RS signal in the synchronization region and/or antenna subarray configuration used by the UE to measure the RS. According to aspects, the BS may request the UE use a particular subarray configuration based on previous measurement results. For example, the BS may assist the UE by indicating which subarray configuration or receive beam to use to measure RSs transmitted in the measurement gap.

According to another aspect, the BS may provide a coarse direction (e.g., coarse location) of a neighboring BS. Coarse direction may include GPS coordinates of the neighboring BS or the neighboring BS's direction/coordinates with respect to the source BS or the UE. With knowledge of a UE's location, the UE may use the coarse location information to fine tune the UE's receive beam in the direction of the neighboring BS. Accordingly, the serving BS may transmit information associated with a location of a target BS to help the UE more efficiently measure RSs.

As described herein, the direction information transmitted by the serving BS may include a beam direction of the reference signal, a UE subarray configuration to use during the measurement gap, or information associated with a location of a target BS. The UE may maps the direction information to a beam direction used in a SYNC-sweep. For example, the UE may set its receive beam in a direction used in the SYNC-sweep for measuring RSs during the measurement gap. The BS may request the UE use a particular antenna subarray configuration based on previous measurement results. According to aspects, the UE may perform a fine-beam sweep using the specified subarray.

Rank Indication

During a measurement gap, a UE with a single RF chain may tune to a neighboring BS for RS measurements. The serving BS may not schedule communication with the UE during the measurement gap.

If the UE has rank 2 and two RF chains, the BS may instruct the UE to point one RF chain towards a neighboring BS for RS measurements during a measurement gap and may also schedule the UE using the other RF chain.

A BS may obtain UE feedback regarding a UE's measurement capability either dynamically (over time) or one-time. The BS may receive a one-time notification from the UE indicating the UE's capability information. The BS may receive a dynamic notification from UE regarding the UE's measurement capabilities. The dynamic notification may be included in measurement reports following a SYNC-sweep. The measurement capability may include RF-chain limitations, rank limitations, etc.

Instead of obtaining the UE's measurement capability, the BS may self-determine a UE's measurement capability.

After demining or obtaining the UE's measurement capability, the BS may instruct the UE to tune its subarray to target BS during the measurement gap. According to aspects, the BS may instruct the UE to tune away a subset of RF chains.

For example, the BS may instruct the UE to tune M RF-chains out of N total RF-chains (where M≤N) for measurements during the measurement gap. One or more of the remaining RF chains (N−M RF-chains) may be used for receiving data from the serving BS.

When a subset of RF chains are used for receiving data from the serving BS during the measurement gap, the BS may terminate the measurement gap earlier than scheduled. An early termination indication may be transmitted to the UE. The BS may schedule the UE based on the rank/layer limitations.

In this manner, the BS may instruct the UE to tune away a subset of RF chains during at least one of the measurement gaps. The BS may instruct the UE to use at least one remaining RF chain for receiving data from the BS during the at least one measurement gap. The BS may transmit signaling terminating at least one measurement gap earlier than scheduled. The BE may communicate with the UE during a remaining portion of the measurement gap, using at least one RF chain in the subset that was used for measurements during the measurement gap.

As described above, during a measurement gap, the UE may tune a single RF-chain in the direction specified by direction indication to measure a RS. According to aspects, the UE may tune M RF-chains out of N RF-chains for measurements in the measurement gap and use the remaining N−M RF-chains for receiving data from serving cell.

According to aspects, the UE may tune all RF-chains independently of BS's rank limitation instructions. If the UE finishes measuring the RSs early, it may resume communication with a serving BS. For example, a rank restriction may be removed for early termination of a measurement gap.

As described herein, a BS may assist the UE in measuring RSs in a wireless communication system using beams. The BS may provide direction information and/or rank information to be applied during one or more measurement gaps. Using this information, the UE may more effectively measure RSs, thereby allowing the BS to make timely beam selection and/or handover decisions.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. As an example, one or more of the components of the BS 110 and the UE 120 illustrated in FIG. 4 may be configured to perform means corresponding to the (method) steps described herein. For example, the antenna 434, mod/demod 432, any combination of the processors 420, 430, and 438, the and controller/processor 440 may be configured to perform means for transmitting, means for receiving, means for determining, means for instructing, means for communicating, means for coordinating, and/or means for performing handover. As another example, the antenna 452, mod/demod 454, any combination of the processors 458, 464, 466, and the controller/processor 480 may be configured to perform the means for receiving, means for measuring, means for transmitting, and means for communicating.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE) comprising:
 exchanging signaling with a serving base station (BS) regarding a measurement capability of the UE;
 based, at least in part, on the signaling, receiving instructions from the BS to simultaneously tune away a subset of radio frequency (RF) chains out of a total number of RF chains to measure one or more reference signals and tune at least one remaining RF chain, not used for measuring the one or more reference signals, to receive data;
 measuring the one or more reference signals using the subset of RF chains; and
 receiving the data using the at least one remaining RF chain.

2. The method of claim 1, wherein measuring the one or more reference signals comprises:
 tuning the subset of RF chains to a neighboring BS to measure the one or more reference signals.

3. The method of claim 1, further comprising:
 receiving, from the serving BS, information regarding at least one measurement gap for measuring the one or more reference signals,
 wherein the measuring occurs during the at least one measurement gap.

4. The method of claim 3, wherein receiving the data using the at least one remaining RF chain occurs during the at least one measurement gap.

5. The method of claim 3, further comprising:
 receiving signaling terminating the at least one measurement gap earlier than scheduled; and
 communicating with the serving BS, during a remaining portion of the at least one measurement gap, using at least one RF chain from the subset of RF chains.

6. The method of claim 3, wherein the information regarding the at least one measurement gap comprises at least one of a system frame number (SFN), subframe index (SFI), or symbol index associated with at least one of the one or more reference signals transmitted during the at least one measurement gap.

7. The method of claim 1, wherein exchanging the signaling comprises:
 dynamically transmitting, by the UE, an indication of the measurement capability.

8. A method for wireless communication by a base station (BS) serving a user equipment (UE) comprising:
 determining a measurement capability of the UE;
 based, at least in part, on the determining, instructing the UE to simultaneously tune away a subset of radio frequency (RF) chains out of a total number of RF chains to measure one or more reference signals and tune at least one remaining RF chain, not used for measuring the one or more reference signals, to receive data; and
 transmitting the data to the UE.

9. The method of claim 8, wherein the determining comprises:
 receiving the measurement capability from the UE.

10. The method of claim 8, wherein the determining comprises:
 self-determining the measurement capability of the UE.

11. The method of claim 8, further comprising:
 transmitting, to the UE, information regarding at least one measurement gap for measuring the one or more reference signals.

12. The method of claim 11, further comprising:
 transmitting signaling terminating the at least one measurement gap earlier than scheduled; and
 communicating with the UE, during a remaining portion of the at least one measurement gap, using at least one RF chain from the subset of RF chains.

13. The method of claim 11, wherein the information regarding the at least one measurement gap comprises at least one of a system frame number (SFN), subframe index (SFI), or symbol index associated with at least one of the one or more reference signals transmitted during the at least one measurement gap.

14. An apparatus for wireless communication by a user equipment (UE) comprising:
 at least one processor configured to:
  exchange signaling with a serving base station (BS) regarding a measurement capability of the UE;
  based, at least in part, on the signaling, receive instructions from the BS to simultaneously tune away a subset of radio frequency (RF) chains out of a total number of RF chains to measure one or more reference signals and tune at least one remaining RF chain, not used for measuring the one or more reference signals, to receive data;
  measure the one or more reference signals using the subset of RF chains; and
  receive the data using the at least one remaining RF chain; and
 a memory coupled to the at least one processor.

15. The apparatus of claim 14, wherein the at least one processor is configured to measure the one or more reference signals by tuning the subset of RF chains to a neighboring BS to measure the one or more reference signals.

16. The apparatus of claim 14, wherein the at least one processor is further configured to:
 receive, from the serving BS, information regarding at least one measurement gap for measuring the one or more reference signals,
 wherein the at least one processor is configured to measure the one or more reference signals during the at least one measurement gap.

17. The apparatus of claim 15, wherein the at least one processor is configured to receive the data using the at least one remaining RF chain occurs during the at least one measurement gap.

18. The apparatus of claim 15, wherein the at least one processor is further configured to:
 receive signaling terminating the at least one measurement gap earlier than scheduled; and
 communicate with the serving BS, during a remaining portion of the at least one measurement gap, using at least one RF chain from the subset of RF chains.

19. An apparatus for wireless communication by a base station (BS) serving a user equipment (UE) comprising:
 at least one processor configured of:
  determine a measurement capability of the UE;
  based, at least in part, on the determination, instruct the UE to simultaneously tune away a subset of radio frequency (RF) chains out of a total number of RF chains to measure one or more reference signals and tune at least one remaining RF chain, not used for measuring the one or more reference signals, to receive data; and
  transmit the data to the UE; and
 a memory coupled to the at least one processor.

20. The apparatus of claim 19, wherein the at least one processor is configured to:

transmit, to the UE, information regarding at least one measurement gap for measuring the one or more reference signals;
transmit signaling terminating the at least one measurement gap earlier than scheduled; and
communicate with the UE, during a remaining portion of the at least one measurement gap, using at least one RF chain from the subset of RF chains.

* * * * *